United States Patent [19]

Byers

[11] Patent Number: 4,840,782
[45] Date of Patent: Jun. 20, 1989

[54] GAS TREATING PROCESS AND COMPOSITION

[75] Inventor: Dallas L. Byers, Katy, Tex.

[73] Assignee: Shell Oil Company, Houston, Tex.

[21] Appl. No.: 139,140

[22] Filed: Dec. 21, 1987

Related U.S. Application Data

[63] Continuation of Ser. No. 937,446, Dec. 5, 1986, abandoned, which is a continuation of Ser. No. 790,763, Oct. 23, 1985, abandoned, which is a continuation of Ser. No. 614,363, May 29, 1984, abandoned.

[51] Int. Cl.⁴ .............................................. C01B 17/05
[52] U.S. Cl. ................................ 423/576.6; 423/223; 423/226
[58] Field of Search ............... 423/220, 223, 224, 225, 423/226, 230, 573 R, 573.6, 576.5

[56] References Cited

U.S. PATENT DOCUMENTS

| | | | |
|---|---|---|---|
| 3,933,993 | 1/1976 | Salemme | 423/226 X |
| 3,972,989 | 8/1976 | Fenton et al. | 423/573 R |
| 4,009,251 | 2/1977 | Meuly | 423/573.6 |
| 4,283,379 | 8/1981 | Fenton et al. | 423/573 R |
| 4,315,903 | 2/1982 | Fenton et al. | 423/573 R |
| 4,382,918 | 5/1983 | Diaz | 423/573 R |
| 4,421,733 | 12/1983 | Blytas | 423/226 X |
| 4,515,764 | 5/1985 | Diaz | 423/573 R |
| 4,518,576 | 5/1985 | Diaz | 423/223 |
| 4,526,773 | 7/1985 | Weber | 423/224 |
| 4,537,752 | 8/1985 | Weber | 423/224 |
| 4,541,998 | 9/1985 | Weber | 423/573 R |

Primary Examiner—John Doll

[57] ABSTRACT

A process for the removal of $H_2S$ from sour gaseous streams is disclosed, the process being characterized by the use of solutions containing vanadium V-containing ions and phosphate ions in sufficient amount to convert the $H_2S$ to elemental sulfur. The process may be cyclic, allowing for continuous operation. A composition suitable for use in the process is also disclosed.

42 Claims, 1 Drawing Sheet

GAS TREATING PROCESS AND COMPOSITION

This is a continuation of application Ser. No. 937,446 filed Dec. 5, 1986, now abandoned, which is a continuation of application Ser. No. 790,763 filed Oct. 23, 1985, now abandoned, which is in turn a continuation of Ser. No. 614,363, filed May 29, 1984, now abandoned.

BACKGROUND OF THE INVENTION

The presence of significant quantities of $H_2S$ and $CO_2$ in various "sour" industrial gaseous streams poses a persistant problem. Although various procedures have been developed to remove and recover these contaminants, most such processes are deficient, for a variety of reasons.

In one cyclic method currently attracting attention, the sour gas is contacted, preferably with a solvent-reactant system which comprises a regenerable reactant, to produce solid free sulfur which is recovered either prior or subsequent to regeneration. Suitable reactant materials include polyvalent metallic ions, such as iron, vanadium, copper, manganese, and nickel, and include polyvalent metal chelates. Preferred reactants are coordination complexes in which the polyvalent metals form chelates with specified organic acids.

In yet another type of process, aqueous alkaline solutions are employed to absorb the $H_2S$ from the gas stream and to convert the absorbed $H_2S$ to elemental sulfur. In general, this type of process employs an aqueous alkaline solution containing vanadium ions and an anthraquinone disulfonate. This type of process usually requires dilute solutions and low $H_2S$ loadings, resulting in high circulation rates, large capital investments, and high costs.

One of the reasons for dilute solution use in the latter type of process is the real problem of maintaining sufficient levels of vanadium in solution. Another problem associated with this process is that the solid sulfur produced, if special measures are not taken, may be of poor quality, i.e., it may be finely divided and difficult to separate from the aqueous reactant solution. Finally, the breakdown of the anthraquinone disulfonate represents extra expense, as well as itself representing a disposal problem. The invention seeks to overcome these problems, and provides an efficient and economic process for $H_2S$ removal.

SUMMARY OF THE INVENTION

Accordingly, the invention, in one embodiment, relates to a process for the removal of $H_2S$ from a sour gaseous stream comprising, contacting the sour gaseous stream in a contacting zone with an aqueous reaction solution, the reaction solution containing an effective amount of vanadium V-containing ions. A sweet gas stream is produced, and an aqueous admixture containing sulfur and vanadium IV-containing ions is removed from the contact zone. The solution further comprises an amount of phosphate ion or ions which is sufficient to enhance the solubility of the vanadium IV-containing ions produced in the solution, at the same time, if solid sulfur is produced, improving sulfur quality, the molar ratio of the phosphate ions to vanadium IV-containing ions produced being at least 0.1. At least a portion of the sulfur may be removed before regenerating the reactant, during regeneration, or at least a portion of the sulfur may be removed after regeneration. Solid sulfur obtained directly, i.e., if the contacting zone is operated below the melting point of sulfur, due to the presence of the phosphate ions, is of improved quality, i.e., the particles or crystals have greater purity and improved filterability. The reduced reactant, i.e., the vanadium IV-containing ions, is regenerated, preferably by contacting the mixture in a regeneration zone or zones with oxygen. The term "oxygen", as used herein, includes oxygen-containing gases, such as air or air-enriched with oxygen. The oxygen oxidizes the reduced vanadium-containing ion to the higher valence state, and the regenerated mixture is returned to the contact zone for use as the aqueous reaction solution. Electrochemical regeneration may also be employed.

A key feature of the invention is the use of reaction solutions of the type described which are free or substantially free of anthraquinone disulfonate (ADA), thus avoiding or substantially avoiding the problems attendant thereto. As used herein, the term anthraquinone disulfonate refers to anthraquinone disulfonate acid or its water soluble salts, such as the disodium salt, while the term "substantially-free" indicates hereinafter that the solutions contain less than 0.2 grams per liter of this material. It has been discovered that, in addition to avoiding the problems related to the anthraquinone disulfonate, the elimination of this material, coupled with the use of phosphate ions, as specified, provides real advantages, as set out more fully hereinafter. Very small amounts of anthraquinone disulfonic acid, e.g. 0.1 g/liter, may, however, be "catalytic" in this system.

In another embodiment of the invention, a sour gaseous system containing $H_2S$ and $CO_2$ is contacted with a selective absorbent-aqueous reactant mixture, the reactant mixture and procedure being similar to that described, supra. Broadly, this is accomplished by the use of an absorbent mixture containing a selective absorbent for $CO_2$ (and preferably for $H_2S$, as well), an effective amount of vanadium V-containing ions, and an amount, as mentioned, supra, of phosphate ion or ions, and in the absence or substantial absence of ADA. A purified or "sweet" gaseous stream is produced which meets general industrial and commercial $H_2S$ and $CO_2$ specifications. The $CO_2$ is absorbed and the $H_2S$ is immediately converted to sulfur by the vanadium V-containing ions. In the process, the vanadium V-containing ions are reduced, producing vanadium IV-containing ions, and the sulfur may be treated, as described, supra. As in the previous embodiment, the sulfur may be removed prior to, during, or subsequent to regeneration of the admixture, and, if the reaction is carried out below the melting point of sulfur, the particles or crystals produced will be of increased size. Preferably, if the volume of $CO_2$ absorbed is large, the reactant-containing solution is treated, such as by heating or pressure reduction, to remove the bulk of the $CO_2$ before regeneration of the reactant (either prior or subsequent to sulfur removal). Alternately, or if small quantities of $CO_2$ are absorbed, the $CO_2$ may simply be stripped in the regeneration zone.

As indicated, supra, the invention also provides in this embodiment for the regeneration of the reactant and the absorbent. Preferably, the loaded absorbent mixture and the reduced polyvalent metal chelate are regenerated by contacting the mixture in a regeneration zone or zones with an oxygen-containing gas. The oxygen-containing gas may be air, oxygen, or air-enriched with oxygen. The oxygen-containing gas accomplishes two functions, the stripping of the $CO_2$ from the loaded absorbent mixture, and the oxidation of the reduced reactant to a higher oxidation state. The oxygen (in whatever form supplied) is supplied in a stoichiometric equivalent or excess with respect to the amount of reactant present in the mixture. Preferably, the oxygen-containing gas is supplied in an amount of from about 1.2 to 3 times excess. The regenerated absorbent mixture is returned to the contact zone for use as the aqueous absorbent mixture.

It has also been discovered that a limited or minor amount of thiosulfate ion may provide improved results on start-up in low $H_2S$ concentration treatment in the embodiments described. Accordingly, the invention also comprises a composition for use in aqueous or aqueous alkaline solutions for removing $H_2S$ from sour gaseous streams, the composition comprising or consisting essentially of (a) an alkali metal, an alkaline earth metal, alkali metal ammonium, or ammonium vanadate;

(b) an alkali metal, alkaline earth, alkali metal ammonium, or ammonium phosphate, polyphosphate, -hydrogen or -dihydrogen phosphate; and (c) an alkali metal, alkaline earth, alkali metal ammonium or ammonium thiosulfate, bisulfite, dithionite or tetrathionite, the ratio of (a) to (b) to (c) being from about 1:0.3 to 6:0.01–1.

Other aspects of the invention will become apparent to those skilled in the art.

The particular type of gaseous stream treated is not critical, as will be evident to those skilled in the art. Streams particularly suited to removal of $H_2S$ and $CO_2$ by the practice of the ivention are, as indicated, naturally occurring gases, synthesis gases, process gases, waste or stack gases, and fuel gases produced by gasification procedures, e.g., gases produced by the gasification of coal, petroleum, shale, tar sands, etc. Particularly preferred are coal gasification streams, natural gas streams and refinery feedstocks composed of gaseous hydrocarbon streams, especially those streams of this type having a low ratio of $H_2S$ and $CO_2$, and other gaseous hydrocarbon streams. The term "hydrocarbon streams", as employed herein, is intended to include streams containing significant quantities of hydrocarbon (both paraffinic and aromatic), it being recognized that such streams contain significant "impurities" not technically defined as a hydrocarbon. Again, streams containing principally a single hydrocarbon, e.g., ethane, are eminently suited to the practice of the invention. Streams derived from the gasification and/or partial oxidation of gaseous or liquid hydrocarbon may be treated by the invention. The $H_2S$ content of the type of streams contemplated will vary extensively, but, in general, will range from about 0.01 percent up to approaching 100 percent by volume. $CO_2$ content may also vary, and may range from about 0.5 percent to over 99 percent by volume provided appropriate pH, as noted herein, is maintained. Obviously, the amounts of $H_2S$ and $CO_2$ present are not generally a limiting factor in the practice of the invention.

The temperatures employed in the contacting or absorption-contact zone are not generally critical. For example, temperatures may range above the melting point of sulfur, say from about 113° C. to 160° C., in which case provision will be made for removal of molten sulfur. Preferably, however, the reaction is carried out at a temperature below the melting point of sulfur, and, if a $CO_2$-selective absorbent is used, temperatures employed must permit acceptable absorption of $CO_2$. In many commercial applications, such as the removal of $H_2S$ and $CO_2$ from natural gas to meet pipeline specifications, contacting at ambient temperatures is desired, since the cost of refrigeration would exceed the benefits obtained due to increased absorption at the lower temperature. In general, temperatures of from about 0° C. to about 160° C. are suitable, and temperatures from about 10° C. to about 80° C. are preferred. Contact times may range from about 0.01 second to about 270 seconds or longer, with contact times of about 0.1 second to 120 seconds being preferred.

Similarly, in the regeneration or stripping zone or zones, temperatures may be varied widely. Preferably, the regeneration zone should be maintained at substantially the same temperature as the absorption zone. If heat is added to assist regeneration, cooling of the absorbent mixture may be required before return of the absorbent mixture to the absorption zone. In general, temperatures of from about 0° C. to about 160° C., preferably about 10° C. to about 80° C. may be employed.

Pressure conditions in the absorption zone may vary widely, depending on the pressure of the gas to be treated. For example, pressures in the absorption zone may vary from about 0.1 atmosphere (absolute) up to one hundred fifty or even two hundred atmospheres (absolute). Pressures of from 0.7 atmosphere (absolute) to about one hundred atmospheres (absolute) are preferred. In the regeneration or desorption zone or zones, pressures may be the same as in the absorption zone, or may be varied considerably. Preferably, they will range from about 0.1 atmosphere (absolute) to about four or five atmospheres (absolute), most preferably from about 0.5 atmosphere to about three or four atmospheres (absolute). The pressure-temperature relationships, pH, etc. involved may be managed by those skilled in the art, and need not be detailed herein. Preferably, pH in the process of the invention will be at least 7, and will range from about 7 to about 14, with a pH range of from about 8 to about 11 being preferred. The procedure is preferably conducted continuously.

As indicated, the $H_2S$, when contacted, is quickly converted by an oxidizing reactant comprising vanadium V-containing ions to elemental sulfur. The amount of vanadium V-containing ions supplied is an effective amount, i.e., an amount sufficient to convert all or substantially all of the $H_2S$ in the gas stream, and will generally be on the order of at least about two moles per mole of $H_2S$. Ratios of from or about 2 moles to about 15 moles of vanadium-containing ions per mole of $H_2S$ may be used, with ratios of from about 2 moles per mole to about 5 moles of vanadium V-containing ions per mole of $H_2S$ being preferred. However, it is an advantage of the invention that, at least at low vanadium concentrations, the solutions employed are stable to over reduction, i.e., oxidative capacity is not degraded by absorption of amounts of $H_2S$ in excess of the theoretical stoichiometric amount.

Insofar as the process of the invention is concerned, any suitable manner of providing the vanadium as a vanadium V-containing ions in solution may be employed. Thus, for example, a vanadium V-containing compound may be dissolved in water, preferably to which phosphorus containing compounds of the invention have already been added. If employed, the thiosulfate species of the invention may then be added. Alternatively, a composition comprising a vanadium IV-containing material may be utilized, it being understood that such a composition can simply be "regenerated" by oxidizing the solution in the regeneration zone.

Compositions suitable for providing the vanadium V-containing ions include vanadium pentoxide, the common alkali metal and ammonium orthovanadates, pyrovanadates, and metavanadates, and vanadium sulfates, halides, phosphates, hydroxides, and oxy-halides, and mixtures thereof. If a vanadium IV-containing compound is utilized, similar types of compounds may be used. Preferably, the compositions of the invention employ sodium, lithium, potassium, or ammonium vanadates.

Similarly, any suitable sources of phosphate and the optional thiosulfate ions may be employed. Such materials include, but are not limited to, ammonium, sodium, potassium, and lithium phosphate, polyphosphate, -hydrogen or -dihydrogen phosphate, and mixtures thereof, and ammonium, sodium, potassium, or lithium thiosulfate, bisulfite, sulfite, dithionite, or tetrathionite, and mixtures thereof. Precursors of any of these materials may be employed. The term "polyphosphate", as used herein, is understood to include ortho- and meta-phosphates, and the various phosphoric acids may be employed. The ratios of the various components are, as noted, supra.

When making the compositions employed in the invention, it is advantageous to dissolve the phsophate species first, adjust pH if necessary to near the desired final pH, dissolve the finely divided vanadate species, and then dissolve the thiosulfate species, if present. Heating and stirring the solution facilitates the dissolution of the added species. Alternatively, the phsophate species can be added to an existing solution comprised of the vanadate species and the thiosulfate species to make the claimed composition. If so, it is advantageous for the vanadate species to be in the oxidized form [vanadium (V)]. If the claimed composition is dissolved in water, the water can be evaporated to dryness by heating and/or reduced pressure, leaving the claimed composition as a dry solid. This dry solid redissolves faster than the original constituents and possesses the same properties as the original claimed composition.

An important feature of the invention is the discovery that phosphate ions increase the utilization of the oxidative capacity for a given concentration of vanadium V-containing solution, at the same time enhancing the solubility of the vanadium IV-containing ions produced in solution by the reaction of the $H_2S$ and the vanadium V-containing ions. If the reaction is carried out below the melting point of sulfur, such an amount also tends to effect an improvement in sulfur quality. According to the invention, sufficient phosphate ion is employed to provide a molar ratio of phosphate ion to vanadium IV-containing ion of at least 0.1. Preferably, the ratio will range from 0.3 or 0.5 to 6:1, most preferably from 1.5 to 3:1. The effects of the use of phosphate ions in the prescribed molar ratio are thus the inhibition of precipitation of the vanadium IV-containing ion, thereby allowing higher loadings of vanadium containing compounds, and the increase in the oxidative capacity of solutions employed at a given vanadium concentration by increasing utilization of the vanadium V-containing ions to approach the theoretical 2 to 1 vanadium V/$H_2S$ stoichiometry. Other benefits, such as increased oxidation rate, decreased salt production, and increased solution stability will accrue at various phosphate concentrations and ratios to Vanadium IV above the minimum given here. Thiosulfate ion, if used, will be present in a molar ratio of 0.1 to 1:1 with respect to the vanadium V-containing ions.

The manner of preparing an admixture containing an absorbent is a matter of choice. For example, the vanadium compound may be added to the absorbent, and, if necessary, then water added. The amount of water added will normally be just that amount necessary to achieve solution of the compound, and can be determined by routine experimentation. Since the vanadium compound may have a significant solubility in the solvent, and since water is produced by the reaction of the $H_2S$ and the vanadium V-containing ion, precise amounts of water to be added cannot be given. Preferably, however, the vanadium compound is added as an aqueous solution to the liquid absorbent. Where the vanadium V-containing ions are supplied as an aqueous solution, the amount of solution supplied may be about 20 percent to about 80 percent by volume of the total absorbent admixture supplied to the absorption zone. The vanadium containing solution will generally be supplied as an aqueous solution having a concentration of from about 0.05 molar to about 2 molar, and a concentration of about 0.5 to 1.0 molar is preferred.

The absorbents employed in this invention are those absorbents which have a high degree of selectivity in absorbing $CO_2$ (and preferably $H_2S$ as well) from the gaseous streams. Any of the known absorbents conventionally used which do not affect the activity of the agents employed and which exhibit sufficient solubility for the reactant or reactants may be employed. As indicated, the absorbent preferably has good absorbency for $H_2S$ as well, in order to assist in the removal of any $H_2S$ present in the gaseous streams. The particular absorbent chosen is a matter of choice, given these qualifications, and selection can be made by routine experimentation. For example, diethylene glycol, tetraethylene glycol, diethylene glycol monoethyl ether, propylene carbonate, tetraethylene glycol-dimethyl ether, N-methyl pyrrolidone, sulfolane, methyl isobutyl ketone, 2,4-pentanedione, 2,5-hexanedione, diacetone alcohol, hexyl acetate, cyclohexanone, mesityl oxide, and 4-methyl-4-methoxy-pentone-2 may be used. Suitable temperature and pressure relationships for different $CO_2$-selective absorbents are known, or can be calculated by those skilled in the art. The manner of recovering the sulfur is a matter of choice. If molten sulfur is produced, the liquid sulfur may be separated by decanting. If the sulfur is solid, the sulfur may be recovered by settling, filtration, liquid flotation, melting, or by suitable devices such as a hydroclone, etc.

In order to describe the invention in greater detail, reference is made to the accompanying schematic drawing. The values given herein relating to temperatures, pressures, compositions, etc., are calculated or merely exemplary and should not be taken as delimiting the invention.

Removal of sulfur "during" regeneration, i.e., from the regeneration zone, although not shown, is within the scope of the invention. Techniques such as those described in U.S. Pat. No. 4,243,648, Fenton, issued Jan. 6, 1981, may be employed.

Figure 1:
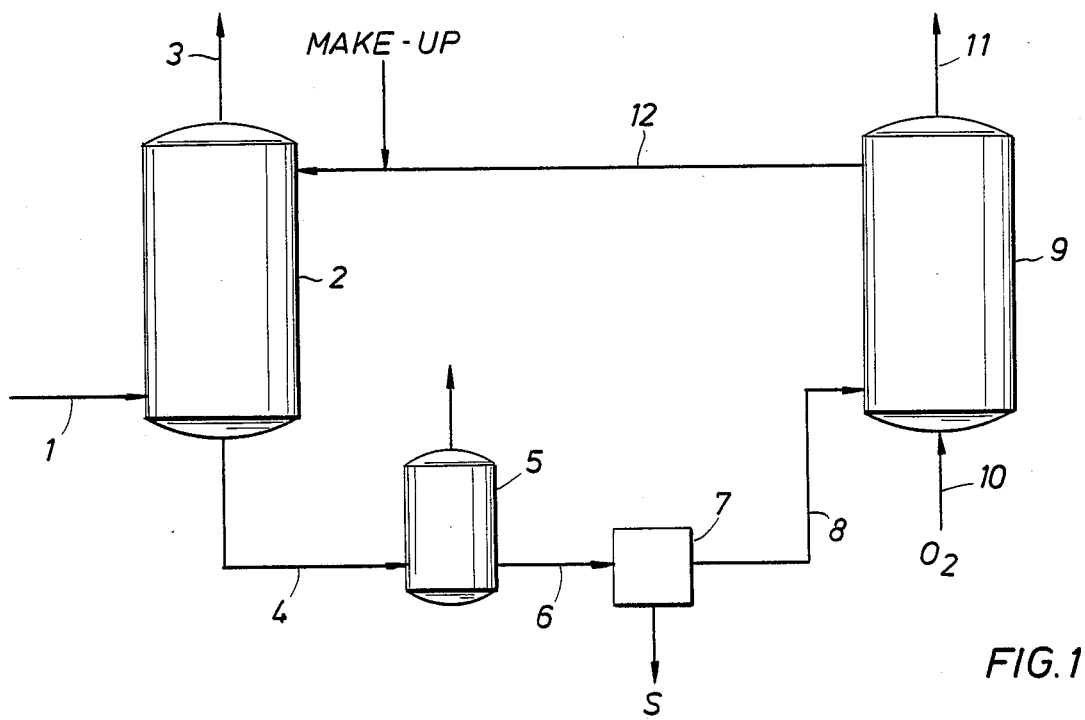
FIG. 1 illustrates the first embodiment of the invention, wherein solid sulfur is removed prior to regeneration.

In FIG. 1, sour gas, e.g., natural gas containing about 0.5 percent by volume $H_2S$, in line (1) enters contactor or column (2) (tray type) into which also enters, from line (12), an aqueous admixture comprising an aqueous solution containing 25 grams per liter of vanadium V (added as $NaVO_3$), phosphate ion, added as 261 grams per liter of dipotassium hydrogen phosphate, and thiosulfate ion, added as 25 grams per liter of sodium thiosulfate. The pressure of the feed gas is about 1200 p.s.i.g., and the temperature of the aqueous admixture is about 55° C. A contact time of about 10 seconds is employed in order to react all the $H_2S$. Purified or "sweet" gas leaves column (2) through line (3). The "sweet" gas is of a purity sufficient to meet standard requirements. In the admixture, the $H_2S$ is converted to elemental sulfur by the vanadium V-containing ions, vanadium V-containing ions in the process being converted to vanadium IV-containing ions. The aqueous admixture containing elemental sulfur is removed continuously and sent through line (4) to a depressurization and degassing unit (5), and then through line (6) to sulfur recovery unit (7). If $CO_2$ is present in the solution, degassing will have the effect of raising solution pH. This effect is beneficial on regeneration. Degassing may be accomplished prior to, during, or after sulfur removal, if sulfur removal is performed before regeneration.

Sulfur recovery unit (7) may be of any suitable type. Preferably, unit (7) comprises a filtration unit. It is not necessary that all the sulfur be removed in the sulfur recovery step, and some sulfur retention may be beneficial. The type of unit chosen is thus flexible. Preferably, the amount of sulfur removed in the separation step is simply balanced with the rate of sulfur intake in reactor (2), which is, of course, dependent on the amount of $H_2S$ in the gas stream (1). Those skilled in the art may adjust the appropriate rates of withdrawal of the streams. From unit (7) the sulfur-free or substantially sulfur free solution is sent via line 8 to regeneration zone (9). In regeneration zone or column (9) the admixture is contacted with excess air from line (10) to convert the vanadium IV-containing ions in the admixture to vanadium V-containing ions. The temperature of the regeneration column is about 45° C., and pressure in the column is maintained at about 2 atmospheres. Spent air is removed from column (9) through line (11), while regenerated aqueous admixture is returned via line (12) to contactor (2). Compressed air or $O_2$ under increased pressure may be used in the regeneration zone if it is not desired to depressurize the system, and this has the benefit of reducing the regeneration time.

As indicated, FIG. 1 illustrates the aspect of the invention wherein the sulfur recovery is carried out prior to regeneration. Removal of the sulfur after regeneration may be preferred in some instances, and may be accomplished by positioning of the sulfur recovery unit "after" the regeneration zone. Thus, in a separate embodiment, regenerated liquid, still containing sulfur, may be passed to units analogous or equivalent to unit (7), sulfur recovered, and regenerated sulfur-free solution returned to contactor (2).

Figure 2:
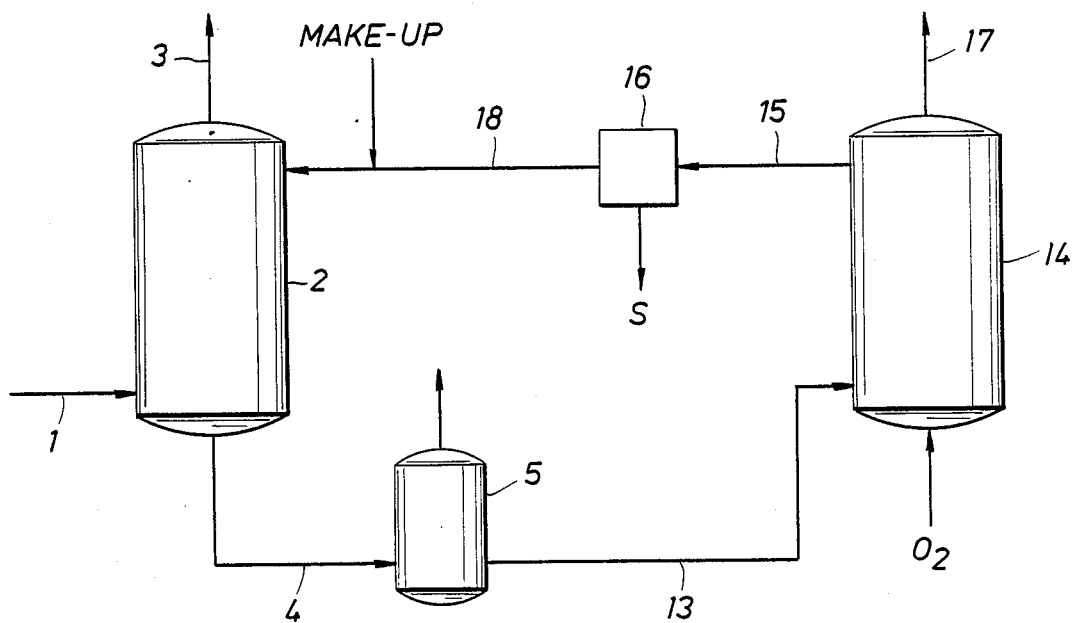
FIG. 2 illustrates removal of the sulfur after regeneration.

Accordingly, in FIG. 2, numbers 1 through 5 refer to equipment or units identical to or substantially equivalent to that described in relation to FIG. 1. The sulfur-containing liquid is passed, after degassing in (5), via line (13) to regenerator (14) where it is regenerated, as previously described. The regenerated sulfur-containing admixture is removed via line (15), and passed to sulfur recovery unit (16). Spent air is removed via line (17). Regenerated reactant solution is returned via line (18) to contactor (2).

While the invention has been illustrated with particular apparatus, those skilled in the art will appreciate that, except where specified, other equivalent or analogous units may be employed. For example, although one type of contactor has been illustrated, other types of contactors, such as packed beds, venturis, etc., may be employed, and, in some instances, may actually be preferred. The term "zones", as employed in the specification and claims, includes, where suitable, the use of segmented equipment operated in series, or the division of one unit into multiple units because of size constraints, etc. For example, a contacting column might comprise two separate columns in which the solution from the lower portion of the first column would be introduced into the upper portion of the second column, the gaseous material from the upper portion of the first column being fed into the lower portion of the second column. Parallel operation of units, is, of course, well within the scope of the invention.

Again, as will be understood by those skilled in the art, the solutions or mixtures employed may contain other materials or additives for given purposes. Make-up and bleed of solution may be carried by those skilled in the art. Pumps, valves, surge vessels, knock-out pots, etc., have not been illustrated in the drawing.

What is claimed is:

1. A process for the removal of $H_2S$ from a sour gaseous stream comprising
   (a) contacting the sour gaseous stream in a contacting zone with an aqueous reaction solution, at a temperature not greater than about 160° C., the reaction solution comprising an effective amount of vanadium V-containing ions to oxidize $H_2S$ to elemental sulfur and being substantially free of anthraquinone disulfonate, and producing a sweet gas stream and an aqueous solution having a pH of 8–11 and containing sulfur and vanadium IV-containing ions, said reaction solution further comprising an amount of phosphate ions sufficient to provide a molar ratio of phosphate ions to vanadium IV-containing ions produced in solution of at least 0.1;
   (b) removing sulfur from the aqueous solution, producing an aqueous solution having reduced sulfur content;
   (c) regenerating aqueous solution having reduced sulfur content in a regenerating zone and producing regenerated reactant in said solution; and
   (d) returning regenerated solution from step (c) to the contacting zone for use as aqueous reaction solution therein.

2. The process of claim 1 wherein the stream from which the $H_2S$ is removed is selected from naturally-occurring gases, synthesis gases, process gases, and fuel gases.

3. The process of claim 1 wherein the sour gaseous stream is selected from natural gas, a stream derived from the gasification of coal, or a hydrocarbon stream.

4. A process for the removal of $H_2S$ from a sour gaseous stream comprising
   (a) contacting the sour gaseous stream in a contacting zone with an aqueous reaction solution, at a temperature below the melting point of sulfur, the reaction solution comprising an effective amount of vanadium V-containing ions to oxidize $H_2S$ to elemental sulfur and being substantially free of anthraquinone disulfonate, and producing a sweet gas stream and an aqueous solution containing solid sulfur and vanadium IV-containing ions, said reaction solution having a pH of 8–11 and further comprising an amount of phosphate ions sufficient to provide a molar ratio of phosphate ions to vanadium IV-containing ions produced in solution of at least 0.1;

(b) removing sulfur from the aqueous solution, producing an aqueous solution having reduced sulfur content;

(c) regenerating aqueous solution having reduced sulfur content in a regenerating zone and producing regenerated reactant in said solution; and (d) returning regenerated solution from step (c) to the contacting zone for use as aqueous reaction solution therein.

5. The process of claim 4 wherein the stream from which the $H_2S$ is removed is selected from naturally-occurring gases, synthesis gases, process gases, and fuel gases.

6. The process of claim 4 wherein the sour gaseous stream is selected from natural gas, a stream derived from the gasification of coal, or a hydrocarbon stream.

7. A process for the removal of $H_2S$ from a sour gaseous stream comprising (a) contacting the sour gaseous stream in a contacting zone with an aqueous alkaline reaction solution at a temperature below the melting point of sulfur, the reaction solution comprising an effective amount of vanadium V-containing ions to oxidize $H_2S$ to elemental sulfur and being substantially free of anthraquinone disulfonate, and producing a sweet gas stream and an aqueous solution containing solid sulfur and vanadium IV-containing ions, said reaction solution having a pH of 8–11 and further comprising an amount of phosphate ions sufficient to provide a molar ratio of phosphate ions to vanadium IV-containing ions produced in solution of at least 0.1;

(b) removing solid sulfur from the aqueous solution, producing an aqueous solution having reduced sulfur content;

(c) regenerating aqueous solution having reduced sulfur content in a regenerating zone and producing regenerated reactant in said solution; and (d) returning regenerated solution from step (c) to the contacting zone for use as aqueous alkaline reaction solution therein.

8. The process of claim 7 wherein the stream from which the $H_2S$ is removed is selected from naturally occurring gases, synthesis gases, process gases, and fuel gases.

9. The process of claim 7 wherein the sour gaseous stream is selected from natural gas, a stream derived from the gasification of coal, or a hydrocarbon stream.

10. A process for the removal of $H_2S$ from a sour gaseous stream comprising (a) contacting the sour gaseous stream in a contacting zone with an aqueous alkaline reaction solution at a temperature below the melting point of sulfur, the reaction solution comprising an effective amount of vanadium V-containing ions to oxidize $H_2S$ to elemental sulfur and being substantially free of anthraquinone disulfonate, and producing a sweet gas stream and an aqueous solution containing solid sulfur and vanadium IV-containing ions, said reaction solution having a pH of 8–11 and further comprising an amount of phosphate ions sufficient to provide a molar ratio of phosphate ions to vanadium IV-containing ions produced in solution of at least 0.1;

(b) regenerating the aqueous solution in a regenerating zone and producing a regenerated reactant in said solution; and (c) removing at least a portion of the solid sulfur from the regenerated reaction solution, producing a regenerated solution having reduced sulfur content;

(d) returning regenerated solution having reduced sulfur content to the contacting zone for use as aqueous alkaline reaction solution therein.

11. The process of claim 10 wherein the stream from which the $H_2S$ is removed is selected from naturally occurring gases, synthesis gases, process gases, and fuel gases.

12. The process of claim 11 wherein the sour gaseous stream is selected from natural gas, a stream derived from the gasification of coal, or a hydrocarbon stream.

13. A process for the removal of $H_2S$ from a sour gaseous stream comprising (a) contacting the sour gaseous stream in a contacting zone with an aqueous alkaline reaction solution at a temperature below the melting point of sulfur, the reaction solution comprising an effective amount of vanadium V-containing ions to oxidize $H_2S$ to elemental sulfur and being substantially free of anthraquinone disulfonate, and producing a sweet gas stream and an aqueous solution containing solid sulfur and vanadium IV-containing ions, said reaction solution having a pH of 8–11 and further comprising an amount of phosphate ions sufficient to provide a molar ratio of phosphate ions to vanadium IV-containing ions produced in solution of at least 0.1;

(b) regenerating the aqueous solution in a regenerating zone and producing a regenerated reactant in said solution, and removing at least a portion of the solid sulfur in the regenerating zone, producing a regenerated solution having reduced sulfur content;

(c) returning regenerated solution having reduced sulfur content to the contacting zone for use as aqueous alkaline reaction solution therein.

14. The process of claim 13 wherein the stream from which the $H_2S$ is removed is selected from naturally-occurring gases, synthesis gases, process gases, and fuel gases.

15. The process of claim 13 wherein the sour gaseous stream is selected from natural gas, a stream derived from the gasification of coal, or a hydrocarbon stream.

16. A process for the removal of $H_2S$ and $CO_2$ from a sour gaseous stream comprising (a) contacting the sour gaseous stream in a contacting zone at a temperature not greater than about 160° C. with a lean $CO_2$-selective alkaline absorbent-reactant mixture containing an effective amount of vanadium V-containing ions to oxidize $H_2S$ to elemental sulfur and being substantially free of anthraquinone disulfonate, and producing a sweet gas stream and an aqueous absorbent solution containing sulfur and vanadium IV-containing ions, said absorbent-reactant mixture having a pH of 8–11 and further comprising an amount of phosphate ions sufficient to provide a molar ratio of phosphate ions to vanadium IV-containing ions produced in solution of at least 0.1;

(b) removing sulfur from the aqueous absorbent solution, and leaving an aqueous absorbent solution containing absorbed $CO_2$ and reduced reactant;

(c) stripping the aqueous absorbent solution containing absorbed $CO_2$ and reduced reactant and regenerating said reduced reactant, producing a lean $CO_2$-selective absorbent solution containing regenerated reactant; and (d) returning lean $CO_2$-selective absorbent solution containing regenerated reactant to the contacting zone for use as lean $CO_2$-selective alkaline absorbent-reactant mixture therein.

17. A process for the removal of $H_2S$ and $CO_2$ from a sour gaseous stream comprising (a) contacting the sour gaseous stream in a contacting zone at a temperature not greater than about 160° C. with a lean $CO_2$-selective alkaline absorbent-reactant mixture containing an effective amount of vanadium V-containing ions, to oxidize $H_2S$ to elemental sulfur and being substantially free of anthraquinone disulfonate, and producing a sweet gas stream and an aqueous absorbent solution containing sulfur and vanadium IV-containing ions, said absorbent-reactant mixture having a pH of 8–11 and further comprising an amount of phosphate ions sufficient to provide a molar ratio of phosphate ions to vanadium IV-containing ions produced in solution of at least 0.1;

(b) removing sulfur from the aqueous absorbent solution, and leaving an aqueous absorbent solution containing absorbed $CO_2$ and reduced reactant;

(c) stripping the aqueous absorbent solution containing absorbed $CO_2$ and reduced reactant, and then regenerating said reduced reactant, producing a lean $CO_2$-selective absorbent solution containing regenerated reactant; and (d) returning lean $CO_2$-selective absorbent solution containing regenerated reactant to the contacting zone for use as lean $CO_2$-selective alkaline absorbent-reactant mixture therein.

18. A process for the removal of $H_2S$ and $CO_2$ from a sour gaseous stream comprising (a) contacting the sour gaseous stream in a contacting zone at a temperature not greater than about 160° C. with a lean $CO_2$-selective alkaline absorbent-reactant mixture containing an effective amount of vanadium V-containing ions to oxidize $H_2S$ to elemental sulfur and being substantially free of anthraquinone disulfonate, and producing a sweet gas stream and an aqueous absorbent solution containing sulfur and vanadium IV-containing ions, said absorbent-reactant mixture having a pH of 8–11 and further comprising an amount of phosphate ions sufficient to provide a molar ratio of phosphate ions to vanadium IV-containing ions produced in solution of at least 0.1;

(b) stripping aqueous absorbent solution containing $CO_2$ and removing $CO_2$ from said absorbent solution, producing a stripped absorbent admixture containing reduced reactant;

(c) removing sulfur from said stripped absorbent admixture, leaving a solution containing reduced reactant;

(d) regenerating solution containing said reduced reactant, producing a lean $CO_2$-selective alkaline absorbent solution containing regenerated reactant; and (e) returning lean $CO_2$-selective alkaline absorbent solution containing regenerated reactant to the contacting zone for use as lean $CO_2$-selective alkaline absorbent reactant mixture therein.

19. The process of claim 1 wherein the molar ratio of phosphate ions to vanadium IV-containing ions in solution is at least 0.3.

20. The process of claim 1 wherein thiosulfate ion is present in minor amounts to provide a 0.1 to 1:1 molar ratio of thiosulfate ions to vanadium V-containing ions.

21. The process of claim 1 wherein the aqueous solution containing vanadium IV-containing ions is degassed before regenerating the aqueous solution.

22. The process of claim 16 wherein the contacting is carried out below the melting point of sulfur.

23. A process for removal of $H_2S$ from a sour gaseous stream comprising contacting the sour gaseous stream with an aqueous reaction solution comprising an effective amount of vanadium V-containing ions to oxidize $H_2S$ to elemental sulfur and produce a sweet gaseous stream and an aqueous solution containing sulfur and vanadium IV-containing ions, said reaction solution having a pH of 8–11 and further comprising an amount of phosphate ions sufficient to provide a molar ratio of phosphate ions to vanadium IV-containing ions produced in solution of at least 0.1.

24. A process for the removal of $H_2S$ from a sour gaseous stream comprising (a) contacting the sour gaseous stream in a contacting zone with an aqueous reaction solution comprising an effective amount of vanadium V-containing ions to oxidize $H_2S$ to elemental sulfur and producing a sweet stream and an aqueous solution containing sulfur and vanadium IV-containing ions, said reaction solution having a pH of 8–11 and further comprising an amount of phosphate ions sufficient to provide a molar ratio of phosphate ions to vanadium IV-containing ions produced in solution of at least 0.1;

(b) removing sulfur from the aqueous solution producing an aqueous solution having reduced sulfur content;

(c) regenerating the aqueous solution having reduced sulfur content in a regenerating zone and producing regenerated reactant in said solution; and (d) returning regeneration solution from step (c) to the contacting zone in step (a) for use as the aqueous reaction solution.

25. A process according to claim 23 or 24 which is conducted at a temperature below the melting point of sulfur.

26. A process according to claim 23 or 24 which is conducted at a temperature of from about 0° C. to about 160° C.

27. A process according to claim 23 or 24 wherein the sour gaseous stream from which the $H_2S$ is removed is selected from naturally occurring gases, synthesis gases, process gases, waste or stack gases, and fuel gases.

28. A process according to claim 23 or 24 wherein the sour gaseous stream is selected from natural gas, a stream derived from the gasification of coal, or a hydrocarbon stream.

29. A process according to any one of claims 1, 4, 7, 10, 13, 16, 17, 18, 23 or 24 wherein the molar ratio of phosphate ions to vanadium IV-containing ions produced in solution is from 0.5 to 6:1.

30. A process according to claim 29 wherein the molar ratio of phosphate ion to vanadium IV-containing ions produced in solution is from 1.5 to 3:1.

31. A process according to any one of claims 1, 4, 7, 10, 13, 16, 17, 18, 23 or 24 wherein the concentration of vanadium V-containing ions in the aqueous reaction solution is from 0.05 to 2 molar vanadium V-containing ions.

32. A process according to claim 31 wherein the concentration of vanadium V-containing ions in the aqueous reaction solution is from 0.5 to 1.0 molar vanadium V-containing ions.

33. A process according to claim 31 wherein the source of vanadium V-containing ions is a compound selected from sodium, lithium, potassium, or ammonium vanadates and the source of the phosphate ions is ammonium, sodium, potassium or lithium phosphate, polyphosphate, -hydrogen or -dihydrogen phosphate or mixtures thereof.

34. A process according to claim 33 wherein the ratio of phosphate ions to vanadium IV-containing ions produced in solution is from 0.3 to 6.1.

35. A process according to claim 23 or 24 wherein thiosulfate ion is present in minor amounts in the reaction solution to provide 0.1 to 1:1 molar ratio of thiosulfate ions to vanadium V-containing ions.

36. A process according to any one of claims 1, 4, 7, 10, 13, 16, 17, 18, 23 or 24 wherein the source of vanadium V-containing ions is a compound selected from sodium, lithium, potassium or ammonium vanadates.

37. A process according to any one of claims 1, 4, 7, 10, 13, 16, 17, 18, 23 or 24 wherein the source of phosphate ions is ammonium, sodium, potassium or lithium phosphate, polyphosphate, -hydrogen or -dihydrogen phosphate or mixtures thereof.

38. A process according to claim 23 or 24 wherein the aqueous reaction solution also contains an absorbent.

39. A process according to claim 38 wherein the absorbent is selective for $CO_2$.

40. A process according to any one of claims 16, 17, 18, or 38 wherein the absorbent is diethylene glycol, tetraethylene glycol, diethylene glycol monoethyl ether, propylene carbonate, tetraethylene glycol-dimethyl ether, N-methyl pyrrolidone, sulfolane, methyl isobutyl ketone, 2,4-pentanedione, 2,5-hexandione, diacetone alcohol, hexyl acetate, cyclohexanone, mesityl oxide or 4-methyl-4-methoxy-pentone-2.

41. A process according to claim 38 wherein the ratio of phosphate ions to vanadium IV-containing ions produced in solution is from 0.5 to 6:1.

42. A process according to any one of claims 1, 4, 7, 10, 13, 16, 17, 18, 23 or 24 wherein the amount of vanadium V-containing ions in the reaction solution is at least two moles per mole of $H_2S$ in the sour gaseous stream.

* * * * *

UNITED STATES PATENT AND TRADEMARK OFFICE
CERTIFICATE OF CORRECTION

PATENT NO. : 4,840,782
DATED : June 20, 1989
INVENTOR(S) : Dallas L. Byers

It is certified that error appears in the above-identified patent and that said Letters Patent is hereby corrected as shown below:

Claim 1, lines 10-11, cancel "having a pH of 8-11".

Claim 1, line 12, after "solution", insert -- having a pH of 8-11 --.

Signed and Sealed this

Eighth Day of May, 1990

Attest:

HARRY F. MANBECK, JR.

*Attesting Officer*     *Commissioner of Patents and Trademarks*